April 28, 1964 R. A. WATERS ETAL 3,130,574
CALIBRATION INSTRUMENT FOR TORQUE GAUGES
Filed May 29, 1961 2 Sheets-Sheet 1
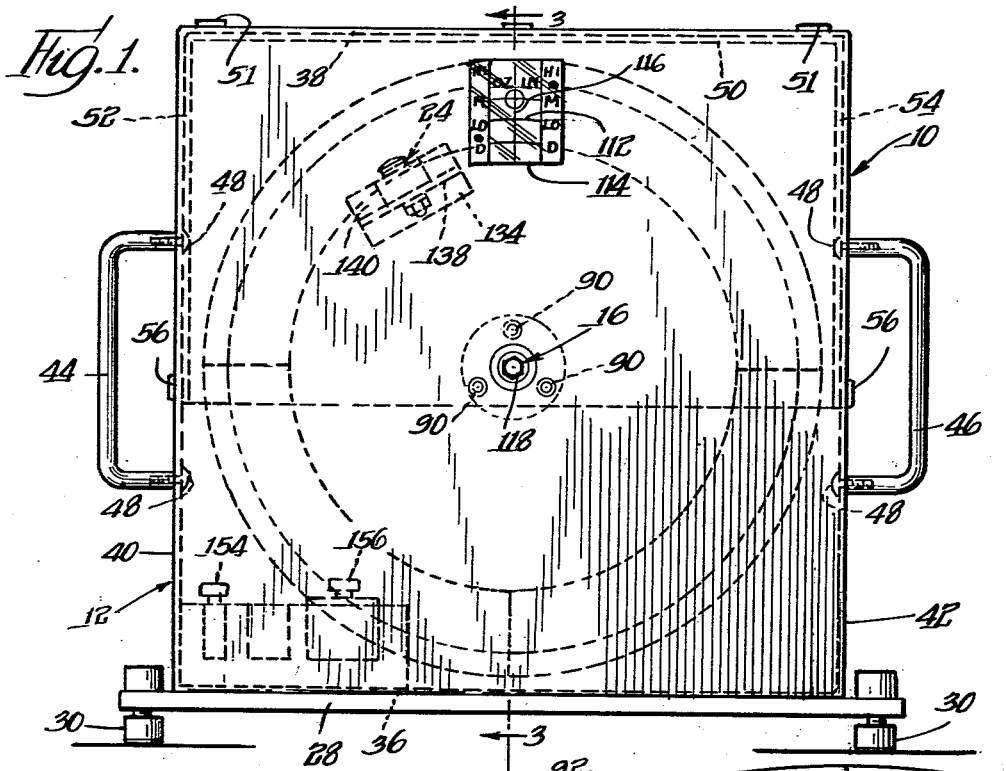
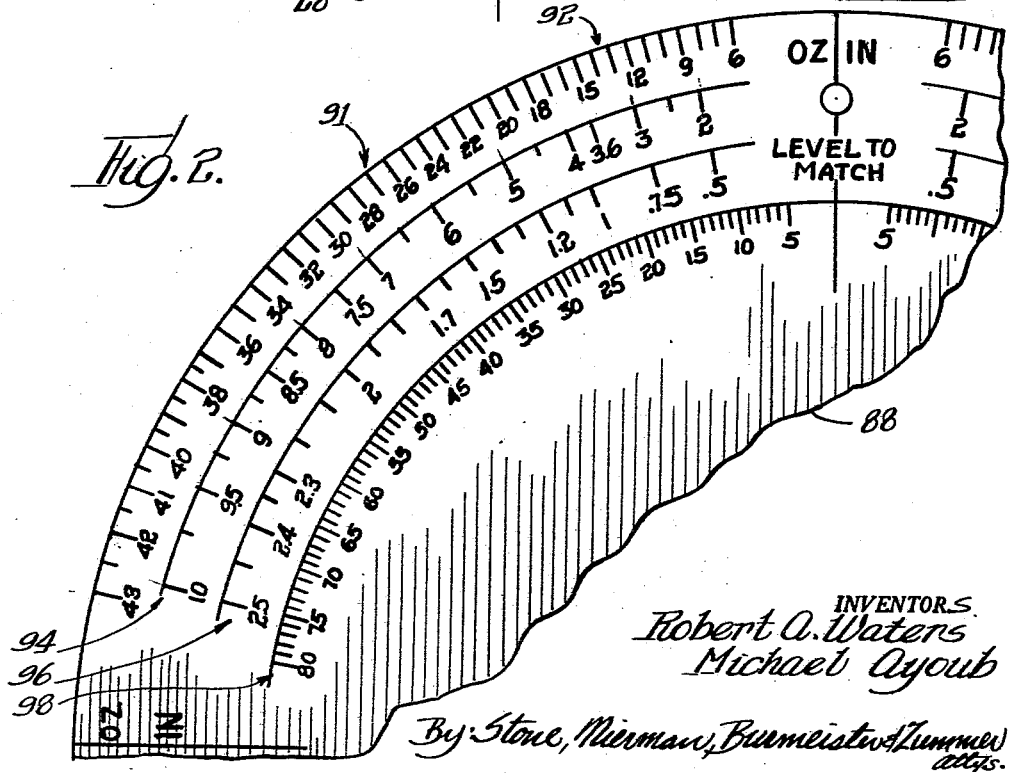
INVENTORS
Robert A. Waters
Michael Ayoub
By Stone, Nieman, Burmeister & Zimmer
attys.

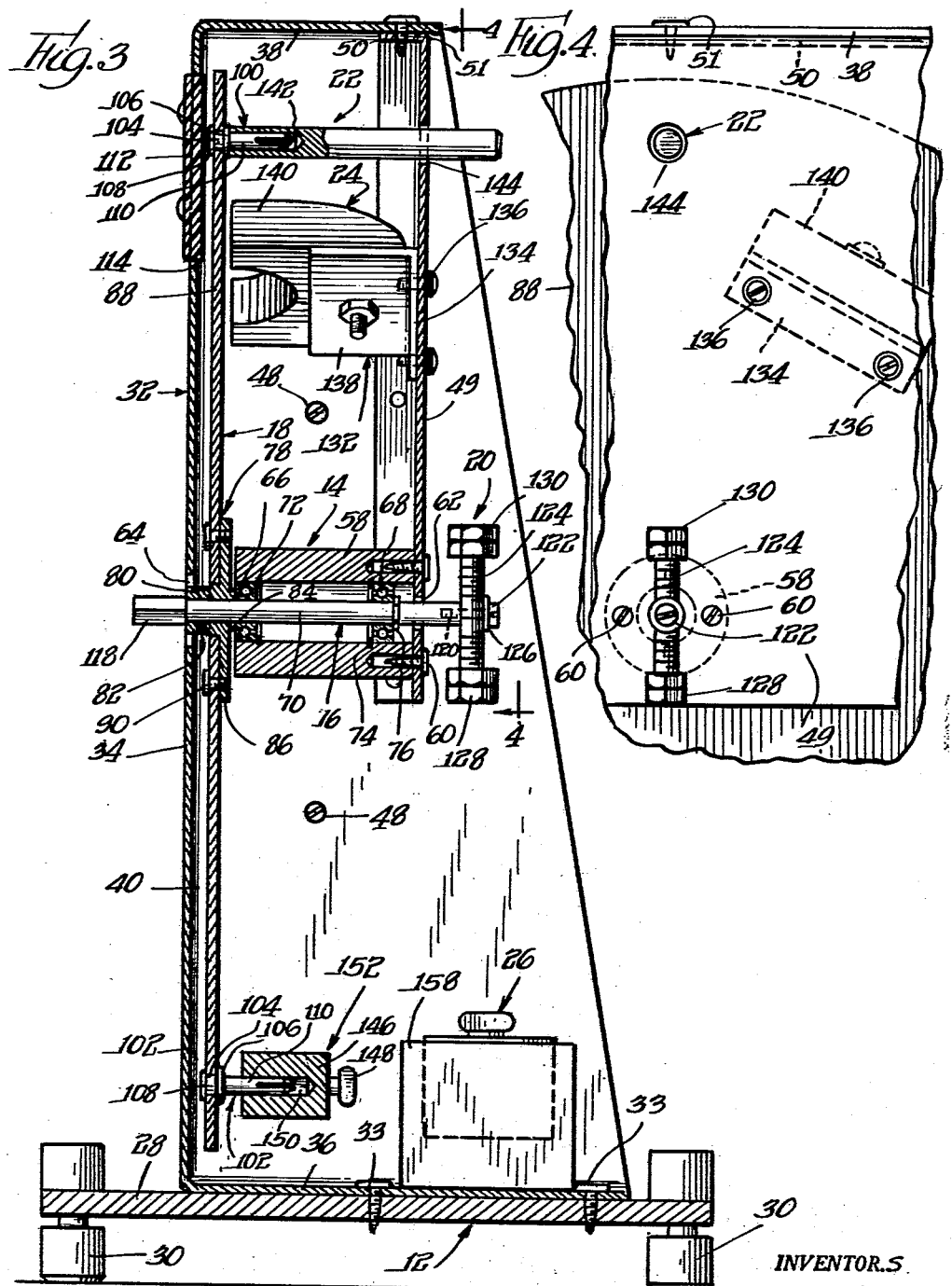

United States Patent Office 3,130,574
Patented Apr. 28, 1964

3,130,574
CALIBRATION INSTRUMENT FOR
TORQUE GAUGES
Robert A. Waters, Weston, and Michael A. Ayoub,
Needham, Mass., assignors to Waters Manufacturing, Inc., Wayland, Mass., a corporation of
Massachusetts
Filed May 29, 1961, Ser. No. 113,264
9 Claims. (Cl. 73—1)

This invention relates to a calibration device for torque gauges, and more specifically to a simple form of highly accurate torque indication device employing a gravitational standard which may be employed for the calibration of portable torque instruments employing less constant torque standards such as springs and similar devices.

It is the principal object of the present invention to provide a laboratory standard instrument for the calibration of torque gauges, particularly for low ranges of torque, i.e., for the calibration of highly sensitive torque gauges. The calibration device of the invention, in addition to being highly accurate, is simple and inexpensive to construct, and is usable over a plurality of accurate ranges by simple interchange of standard weights. Furthermore, by a simple manipulation, the calibration device of the invention is readily converted to read directly in a plurality of systems of units, such as the torque units (inch-ounces) of the British system or the corresponding units units (gram-centimeters) of the metric system. Provision is also made in a simple and novel manner for setting the "zero" of the instrument to adjust for minor tolerances in manufacture.

It has previously been recognized that if a weight is suspended from a shaft by a rigid connection, a static torque applied to the shaft will produce a deflection which may be calibrated in terms of the torque applied, and torque measuring and calibrating devices employing this principle have heretofore been described. However, the devices of this type heretofore proposed have not been satisfactory for practical use in low torque ranges, either being insufficiently sensitive and accurate for this purpose, or being excessively expensive for everyday use in industrial and similar installations wherein torque measurements are commonly required. The present invention, however, although based on the same general principle, utilizes the principle in a novel manner to produce an instrument which is highly satisfactory from both the standpoints of performance and cost.

In the present instrument, a round flat disk is affixed to a horizontally extending shaft which is mounted on the instrument housing by suitable precision bearings and provided with a simple type of balancing weight so that the entire disk and shaft assembly is gravitationally balanced in all positions. The disk is provided, at diametrically opposite points, with a simple but accurate fastener or mount by means of which there may be readily mounted any one of a series of standard weights. The halves of the circumference of the face of the disk bear calibration markings in the two respective unit systems, and a hairline or similar fixed indicator on the housing is provided opposite one of the two scales, so that changing of the position of the weight changes the unit system which is being employed, thus utilizing the entire circumference of the disk for scale markings. The utilization of the balanced disk for support of the weight standards also permits the use of simple eddy-current damping when torque is removed after calibration, thus preventing the oscillations otherwise produced. In addition, as an auxiliary, there is provided a novel form of lock to prevent undesired shaft rotation, and thus bearing wear, when the highly sensitive instrument is not in use.

Other features of the invention, and the aims and objects accomplished thereby, will be apparent from a description of the embodiment of the invention illustrated in the drawings, in which:

FIGURE 1 is a front elevation of a calibration instrument embodying the invention with a portion of its front broken away to show better the construction of the invention;

FIGURE 2 is a fragmentary view of a portion of a disk which constitutes an element of the calibration instrument shown in FIGURE 1 and bears torque indicia indicated in ounce-inches;

FIGURE 3 is a cross-sectional view taken on line 3—3 of FIGURE 1; and

FIGURE 4 is a fragmentary view of a portion of the back of the calibration instrument shown in FIGURE 1 taken along line 4—4 of FIGURE 3.

Referring now to the drawings, it may be seen that the torque indicator, generally indicated by numeral 10, consists of a base 12, a bearing assembly 14 mounted in the base, a shaft 16 having its axis of rotation in a horizontal plane rotatably mounted in the bearing assembly, a disk assembly 18 fixed to the shaft, a balance 20 connected to the shaft 16 for balancing the disk 18, a stop pin 22 connected to the disk assembly to lock the disk assembly relative to the base, an eddy current brake 24 mounted on said base to cooperate with the disk assembly in order to damp the rotation of the disk assembly, and weights 26 positioned on said base for mounting on the disk assembly to provide the necessary calibrated force for measuring torque.

The base includes a sheet metal floor 28 which is generally rectangular and has an adjustable foot 30 positioned in each corner. Each of these adjustable feet may be adjusted in a vertical direction in order to make the instrument level and place the axis of rotation of shaft 16 in a plane perpendicular to the force of gravity. A sheet metal vertical front panel 32 is connected to the floor 28 by screws 33. The front panel has a front face 34 and a bottom panel 36. Integral with the front face is a panel top 38 which is perpendicular thereto. The front face also has formed integral therewith a pair of panel sides 40 and 42 which have handles 44 and 46 secured thereto by screws 48 in a conventional fashion.

The base is completed by a sheet metal back 49. The back has a forwardly extending upper edge 50 formed integral therewith and is secured to panel top 38 by means of sheet metal screws 51. The back also has forwardly extending side edges 52 and 54 which are formed integral therewith and secured to the panel sides 40 and 42, respectively, by screws 56.

As was mentioned above, bearing assembly 14 is secured to the base 12 and rotatably supports the shaft and disk. The bearing assembly includes a housing 58 which is generally cylindrical and is secured to the back 49 by a plurality of screws 60. The housing 58 has its center aligned with a shaft aperture 62 in back 49 and a shaft aperture 64 in front face 34. The housing has a pair of ball bearings 66 and 68 mounted therein which receive a bearing portion 70 of the shaft 16. Outer race lock rings 72 and 74 are mounted within the housing 58 and engage the respective outer races of bearings 66 and 68 to hold each of the bearings in one direction. An inner race lock ring 76 is positioned in a groove in the bearing portion of shaft 16 in engagement with the inner race of bearing 68 in order to lock the bearing in position. The other bearing 66 engages a hub 78 of the disk assembly 16 to lock this bearing 66 in position along the axis of the shaft.

The hub 78 includes a collar 80 which has a set screw 82 fixed therein locking the hub to the shaft 16. The hub includes a boss 84 at the point of engagement of the above mentioned bearing 66. The hub also includes an integral flange 86 which is secured to a flat circular disk 88 by means of a plurality of screws 90. In this instance the disk 88 is made of aluminum; however, any suitable non-magnetic conductive material may be used.

The disk 88 has torque indicia 91 applied to the front face. One-half of the disk has indicia calibrated in the metric system and the other half is calibrated in the British system (FIGURE 2). The indicia for high, low and intermediate (medium) ranges are indicated at 92, 94 and 96, respectively. The innermost scale 98 is not a set of torque indicia but rather indicia of angular displacement. The three torque indicia scales are of course sinusoidal in calibration increments.

The disk assembly 16 also includes a pair of weight mounts 100 and 102 mounted on the disk diametrically opposed to each other and spaced an equal distance from the center of the disk. Each of the weight mounts is identical in construction to the other weight mount, inasmuch as both are adapted to receive the same weights. Each weight mount includes a stud 104 which is positioned in a weight mount aperture in the disk 88. Each weight mount has a collar 106 formed integral with the stud to hold the weight mount in one direction. The front end of the stud 104 is upset, so that there is an enlarged end 108 which locks the stud in position. A split post 110 is formed integral with the collar 106 and snugly and resiliently receives an aperture within a weight. As may be seen in the drawings, the weight mounts are positioned diametrically opposite each other and are positioned at the zero line of the disk. When a weight is positioned on either weight mount, the torque indicia are at a zero position.

The torque indicia set 91 is cooperative with an indicator 112 which is mounted on the front panel 32. The front panel 32 has a window aperture 114 which is positioned directly above the shaft aperture 64. The aperture 114 has the indicator 112 mounted therein, having a hairline 116.

In order to maintain a perfect balance, balance 20 is provided on the back end of shaft 16. The front end of the shaft 16 includes a hexagonal end portion 118 which provides a means for connecting a torque device to the shaft and thus to the disk 88. The back end extends through the shaft aperture 62 and has a threaded aperture 120 receiving a screw 122 which passes through a threaded rod 124. A washer 126 is positioned between the screw 122 and threaded rod 124. The threaded rod 124 has a pair of nuts 128 on one end and a second pair of nuts 130 on the other end to provide blaance weights. The threaded rod 124 may be readily rotated relative to the shaft 16 so that the angular position of the nuts 128 and 130 may be adjusted to accommodate any particular situation of unbalance.

As was mentioned above, eddy current brake 24 is mounted on the base 12 cooperative with the disk assembly. A magnet mount 132 includes a back flange 134 which is secured to the back 49 by a pair of screws 136. The back flange 134 has formed integral therewith a magnet flange 138 which has secured thereon a permanent horseshoe magnet 140. The magnet 140 is secured to the flange 138 by a conventional bolt and nut. The poles of the horseshoe magnet 140 are positioned perpendicular to the disk 88 and parallel to the axis of rotation of the disk. Since the eddy current braking force thus exerted on the disk varies only with speed, and is independent of direction, the assembly is a highly efficient damping device having no effect on calibration. The efficiency is of course maximized, for a magnet of any given strength, by the employment of a very small gap between the magnet and its flux return (illustrated as being the front panel), and it is also desirable that this field traverse the outer region of the disk, the efficiency in this manner being maximized by the high speed of motion of this portion of the conducting disk, as well as the increase of damping torque by the application of the retarding force in this peripheral region. In the present construction, as may be seen, the eddy current brake is in the upper outer portion of the disk, i.e., substantially spaced from the axis on the side of the axis opposite the weight, so that this high efficiency of damping may be obtained, in addition to assuring against the introduction of spurious torque due to interaction between the magnet and the weight.

In order to lock the disk into position when the device is not in use, the stop pin 22 is provided. The stop pin 22 includes an axial post aperture 142 which receives the split post 110 of a weight mount, in this instance, weight mount 100. The stop pin, when in position, extends through a stop pin aperture 144 in back 49 so that rotation of the disk relative to the base is blocked.

The three weights 26 are provided for use with the three corresponding scales. Each of the weights includes a body 146 and a handle portion 148. Each body has an axial post aperture 150 extending partially therethrough for receiving a split post of a weight mount. A wooden weight box 158 is fixed to the floor 28 for storage of the weights.

The device is used in the following manner, as may be obvious from the description of the construction. Balancing of the disk assembly (which may be a factory operation, since it need not ordinarily be repeated) is accomplished by first allowing the disk assembly to rotate freely from various set positions with no weight attached to the weight mounts and no torque applied to the shaft, to indicate any unbalance. If it is determined by observation of the disk that it is necessary to compensate for any inaccuracies in construction or differences in thickness or density in the disk, the balance 20 is used. As was mentioned above, the threaded rod 124 may be rotated relative to the shaft 16 so that the weight of the nuts 128 and 130 may be used to compensate for any particular unbalance. The nuts 128 and 130 may be moved inward or outward in respect to each other in order to make a proper adjustment. Thus, the disk is balanced and there are no extraneous gravitational forces being applied to the disk. With a weight in place, levelling may be accomplished by means of feet 30 with a weight installed on the disk, the matching of the hairline and the zero line on the scale being an accurate indication of levelling.

With the device in a level position and the disk balanced, any selected weight is removed from the weight box and applied to one of the weight mounts, either 100 or 102, depending upon the units in which the measurement is desired.

With a selected weight on the weight mount 102, a torque is applied to the hexagonal end 118 of the shaft 16 so that the weight is lifted. When the torque is released from the disk, the eddy current brake 24 damps the resulting oscillations of the pendulum-like structure, the front face of the housing being of a metal of substantial magnetic permeability to complete the magnetic circuit in the double gap in which the disk is disposed.

From the foregoing description, it is readily apparent that it is only the weight which has the effective force in the device since the weight support is the circular disk, which is balanced. Thus, there may be a high degree of accuracy, depending totally on the accuracy of the weight, without any necessity of adjustment in changing weights. It is also readily apparent that it is possible to use even larger weights than provided and take a measurement of the angular displacement to compute the torque applied without the use of torque indicia. Other advantages and uses of the present device will become apparent to those skilled in the art.

Since many alterations of the illustrated device which utilize the invention will be apparent to persons skilled in the art upon study, it is to be expressly understood

What is claimed is:

1. A torque indicator comprising, in combination, a base having a front face and a back; a shaft rotatably mounted in the front face and the back; a flat circular electrically conductive disk fixed to the shaft between the front face and the back; said disk being nonmagnetic; said shaft having one end protruding from said front face to receive a torque-producing device; a disk balance connected to said shaft for balancing the disk for rotation about its axis of rotation; said disk having sets of torque measuring indicia on the side adjacent to the front face at diametrically opposed positions; said front face having an aperture and an indicator mounted in said aperture cooperative with the torque measuring indicia; a magnet mounted on said back adjacent to the disk for cooperation therewith to provide an eddy current brake for said disk; a pair of weight mounts secured to the disk and extending toward said back; each of said weight mounts being positioned adjacent to the periphery of said disk and being diametrically opposed to each other; and weights removably positionable on either weight mount.

2. A torque indicator comprising, in combination, a base, a circular nonmagnetic electrically conductive disk rotatably mounted on said base, said disk having torque measuring indicia on one side, a weight attached to said disk in the outer region thereof, means secured to said disk at its axis of rotation for connecting the disk to a torque device, and a magnet mounted on said base closely adjacent to one side of the upper outer portion of said disk for damping the movement of the disk, the sole force exerted by the magnetic field on the disk thus being damping of rotational motion and the disk being free of force exerted by the magnetic field when stationary in any position.

3. A torque indicator comprising, in combination, a flat circular nonmagnetic electrically conductive disk having torque measuring indicia on one side, a weight removably attached to said disk, a shaft connected to the center of said disk, a threaded rod attached to the shaft angularly positionable relative to the shaft in a plane perpendicular to the axis of the shaft, a balance weight movably mounted on the threaded rod for balancing the disk, a base rotatably supporting said shaft, and means for producing a magnetic field through the upper outer portion of said flat circular disk to provide damping against rapid rotation of the disk relative to the base, the sole force exerted by the magnetic field on the disk thus being damping of rotational motion and the disk being free of force exerted by the magnetic field when stationary in any position.

4. A torque indicator comprising, in combination, a front face, a back spaced from said front face and secured thereto, a shaft rotatably mounted in the front face and the back and being in a horizontal plane, a flat circular nonmagnetic electrically conductive disk connected to the shaft for rotation with said shaft and being mounted between the front face and the back, said shaft having one end protruding from said front face to receive a torque measuring device, a threaded rod connected to the shaft and being perpendicular to the axis of said shaft, said threaded rod being angularly positionable relative to the shaft in a plane perpendicular to the axis of the shaft, said disk having sets of torque measuring indicia on diametrically opposed portions of the side adjacent to the front face, said front face having an aperture and an indicator mounted in said aperture cooperative with the torque measuring indicia for indicating torque, a pair of weight mounts secured to the disk and extending toward the back, each of said weight mounts being positioned adjacent to the periphery of said disk and being diametrically opposed to each other, and a weight removably positioned on one of said weight mounts.

5. A torque indicator comprising, in combination, a disk having sets of torque measuring indicia on one side at diametrically opposed locations, a front face positioned adjacent to the disk, said front face having an aperture therein and an indicator mounted in said aperture cooperative with the torque measuring indicia for indicating torque, a shaft rotatably mounted in said front face and fixed to the disk at the center of said disk, a back rotatably supporting said shaft and being poistioned adjacent to said disk, a pair of weight mounts secured to the disk and extending toward the back, each of said weight mounts being positioned adjacent to the periphery of said disk, each of said weight mounts being diametrically opposed to each other and being spaced an equal distance from the axis of rotation of said shaft.

6. A torque indicator comprising, in combination, a floor, a front face secured to said floor, a back secured to the front face, a shaft rotatably mounted in the front face and the back having its axis of rotation in a horizontal plane, a flat circular nonmagnetic electrically conductive disk fixed to the shaft between the front face and the back, said shaft having one end protruding from said front face to receive a torque measuring device, said disk having sets of torque measuring indicia at diametrically opposed portions of the side adjacent to the front face, said front face having an aperture and an indicator mounted in said aperture cooperative with the torque measuring indicia for indicating torque magnitude, said shaft having its other end protruding from the back, a threaded rod adjustably connected to the other end of said shaft substantially perpendicular to the shaft, said threaded rod being angularly adjustable relative to the shaft in a plane perpendicular to the shaft, a balance weight movably mounted on said threaded rod for balancing said disk and shaft, a permanent magnet mounted on said back in a plane perpendicular to the disk and being adjacent to the disk to provide an eddy current brake for said disk, a pair of weight mounts secured to the disk and extending toward the back, each of said weight mounts, being positioned adjacent to the periphery of said disk and equidistant from the axis of rotation of said shaft and diametrically opposed to each other, and a stop pin removably positioned on one of said weight mounts and positioned in an aperture in the back to lock the disk relative to said back.

7. A torque indicator comprising, in combination:
(a) a horizontal-axis balanced rotatable assembly bearing a plurality of sets of torque-measuring indicia at angularly spaced locations and at substantially equal distances from the axis of rotation,
(b) a stationary indicator cooperating with said indicia for indication of position of the rotatable member,
(c) weight mounts on the indicating assembly corresponding in number and angular spacing to the indicia sets,
(d) each weight mount being located to bring a respectively corresponding indicia set into torque-indicating relation with the stationary indicator upon mounting of a weight thereon and
(e) means to apply a torque under measurement to the indicating assembly.

8. The torque indicator of claim 7 having:
(f) means for producing a magnetic field through the indicating assembly at a location substantially spaced from the axis,
(g) all portions of the indicating assembly passing through the magnetic field in its full rotational path being nonmagnetic and electrically conducting.

9. A torque indicator comprising, in combination:
(a) a horizontal-axis rotatable indicating member having a weight thereon and having a portion extending a substantial distance from the axis in the direction opposite the weight,
(b) a stationary member, said members having cooperative indicia for indication of relative rotational position, (c) means for applying a torque to be measured to the indicating assembly, and
(d) means for producing a magnetic field through said portion of the indicating member opposite the weight,
(e) all portions of the indicating assembly subjected to the magnetic field being nonmagnetic and electrically conducting, thus providing damping of the assembly upon the removal of torque, the assembly being free of force exerted by the magnetic field in all stationary positions.

References Cited in the file of this patent

UNITED STATES PATENTS

| | | |
|---|---|---|
| 1,305,150 | Myers | May 27, 1919 |
| 1,542,809 | Alexander et al. | June 23, 1925 |
| 2,013,109 | Reynolds | Sept. 3, 1935 |
| 2,933,821 | d'Enis | Apr. 26, 1960 |
| 3,027,748 | Brenner | Apr. 3, 1962 |

FOREIGN PATENTS

| | | |
|---|---|---|
| 458,140 | Great Britain | Dec. 14, 1936 |